Patented Feb. 20, 1923.

1,445,685

UNITED STATES PATENT OFFICE.

JOHANN HUISMANN AND JÜRGEN CALLSEN, OF LEVERKUSEN, NEAR COLOGNE, AND WILHELM GRÜTTEFIEN, OF ELBERFELD, GERMANY, ASSIGNORS TO FARBENFABRIKEN VORM. FRIEDR. BAYER AND CO., OF LEVERKUSEN, NEAR COLOGNE, GERMANY.

ORGANIC ARSENIC COMPOUND.

No Drawing. Application filed September 27, 1921. Serial No. 503,587.

*To all whom it may concern:*

Be it known that we, JOHANN HUISMANN, JÜRGEN CALLSEN, and WILHELM GRÜTTEFIEN, citizens of Germany, residing at, respectively, Leverkusen, near Cologne, and Elberfeld, Germany, have invented new and useful Improvements in Organic Arsenic Compounds, of which the following is a specification.

This invention relates to a new organic arsinic compound having most probably the following formula:

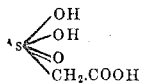

Our new product can be obtained by the interaction of chloro acetic acid or with arsenic oxid $As_2O_3$ or its derivatives and salts with the addition of alkalies or alkalin compounds.

The resulting compound is of great value for arsenic treatment, the administration being by intramuscular injections or for internal use. It may also be used for animals.

In order to illustrate our new process more fully the following example is given, the parts being by weight:—198 parts of arsenic oxid $As_2O_3$ are dissolved in 330 parts of sodium hydroxid and 700 parts of water. Subsequently 273.5 parts of chloro-acetic acid $Cl—CH_2—COOH$ are dissolved in a cold solution of 130 parts of NaOH in 130 parts of water. The latter solution is then added whilst stirring to the solution of arsenic. After the reaction is complete the mixture is neutralized with acetic acid and rendered alkalin with a surplus of ammonia. By the addition of calcium chlorid the calcium salt of the acetic arsinic acid is precipitated, filtered off and dried.

120 parts of this calcium salt are heated on the water bath together with 1500 parts of normal sulfuric acid, the sulfate of calcium is filtered off and the filtrate is evaporated in vacuo at 70–80° C. The raw acetic arsinic acid thus obtained is stirred up with acetone, filtered off and dried. It is then further purified by dissolving it in 5 parts of hot alcohol, cooling, filtering and evaporating to a small portion in vacuo at about 50–60° C. By the addition of benzene the new product is obtained. It crystallizes from 10 parts of glacial acetic acid in the shape of hard colorless crystals melting at 152° C. It has most probably the formula:

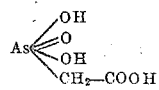

and forms salts with metals. Its ethyl ester melts at 94–95° C. It is almost insoluble in acetone, benzene and ether, easily soluble in water and in alcohol.

We claim:—

The herein described new acetic arsinic acid having most probably the formula:

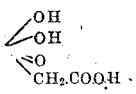

which crystallizes from glacial acetic acid in the shape of hard colorless crystals melting at 152° C. being almost insoluble in acetone, benzene and ether, easily soluble in water and in alcohol; forming salts with metals which salts retain the valuable therapeutic properties of the free acid, substantially as described.

In testimony whereof we have hereunto set our hands in the presence of two subscribing witnesses.

JOHANN HUISMANN. [L. S.]
JÜRGEN CALLSEN. [L. S.]
WILHELM GRÜTTEFIEN. [L. S.]

Witnesses:
HANS BIRÜKNER,
EDUARD IVENUDEZ.

Certificate of Correction.

It is hereby certified that in Letters Patent No. 1,445,685, granted February 20, 1923, upon the application of Johann Huismann and Jürgen Callsen, of Leverkusen, near Cologne, and Wilhelm Grüttefien, of Elberfeld, Germany, for an improvement in "Organic Arsenic Compounds," an error appears in the printed specification requiring correction as follows: Line 18, strike out the word "or"; and that the said Letters Patent should be read with this correction therein that the same may conform to the record of the case in the Patent Office.

Signed and sealed this 17th day of July, A. D., 1923.

[SEAL.]
WM. A. KINNAN,
*Acting Commissioner of Patents.*